UNITED STATES PATENT OFFICE.

OLIVER KAMM, OF HOLYOKE, MASSACHUSETTS, ASSIGNOR TO AMERICAN WRITING PAPER COMPANY, OF HOLYOKE, MASSACHUSETTS, A CORPORATION OF NEW JERSEY.

METHOD FOR THE EMULSIFICATION OF RESIN SOAP IN WATER.

1,415,363.

Specification of Letters Patent. Patented May 9, 1922.

No Drawing. Application filed April 23, 1919. Serial No. 292,086.

*To all whom it may concern:*

Be it known that I, OLIVER KAMM, a citizen of the United States of America, and a resident of Holyoke, in the county of Hampden and State of Massachusetts, have invented a new and useful Method for the Emulsification of Resin Soap in Water, of which the following is a specification.

My invention relates to improvements in processes or methods of emulsifying, dissolving, and preparing size for paper-making, and resides in the steps and combinations of steps hereinafter set forth.

The primary object of my invention is so to emulsify the size, by a simple, economical, and efficient method, with which is obtained a clear instead of a "milky" solution, such solution being free from resin particles in suspension, that with such size a strong paper is produced, resin-spots in the paper are avoided, and the paper shows less discoloration with age, and there is a saving in size.

The size resulting from my method has improved glueing properties.

This size is adapted for all kinds of paper, including those in which the presence of resin is more especially disadvantageous, such as paper used in photography or in engraving for example.

The resin size ordinarily used in the manufacture of paper is a mixture of resin soap with varying amounts of free resin. In dissolving such a mixture the resin soap acts as an emulsifying agent for the free resin, and it is evident that the facility with which emulsification will take place must decrease with an increase in the proportion of free resin. The ordinary size used by papermakers contains about twenty-five per cent of free resin, but it is often desirable to use proportions of free resin amounting to about forty-five per cent of the total resin.

In order that what is meant by "resin size" may be understood the following is submitted:

When resin size containing 30% free resin is mentioned it is understood that of the total quantity of resin present 30% is present as free resin and 70% is present as combined resin. Similarly with 40% free resin size it is understood that of the total resin 40% is free resin and 60% is present as combined resin.

In the emulsification of size containing more than twenty-five per cent of free resin considerable difficulty has been experienced, such difficulty being due to the separation of free resin from the emulsified solution. With my method the aforesaid difficulty is removed or avoided.

I have discovered that resin size and water may form two types of emulsions, namely, an emulsion of water-in-size, and an emulsion of size-in-water. The formation of emulsions of these two types may be demonstrated conveniently with resin-size containing thirty-five per cent of free resin. When this size is heated with about one part by weight of water, a clear solution is obtained which from the nature of its solubility is found to be an emulsion of water-in-resin-size. Upon adding hot water to this solution a thick gel is obtained, but, upon adding still more water, four or five parts, and heating said solution to its boiling-point, a clear solution is again obtained. This latter solution is an emulsion of resin-size-in-water. The addition of more water to the hot solution causes the separation of free resin. The cooling of the solution to a considerably lower temperature also causes the separation of free resin.

The actual quantity of water that may be incorporated in or with resin size, in order to form or produce a clear emulsion as above described, depends primarily upon the quantity of free resin present in the size, but it also depends further or secondarily upon the composition of the resin, and, as has already been stated, upon the temperature of the solution. For high percentages of free resin the proportion of water may be varied only between narrow limits, as is shown by the following figures obtained by using ordinary "F grade resin" at approximately 100 degrees C.

30% free resin,
70% combined resin requires approximately 4½ to 9 parts of water.

35% free resin,
65% combined resin requires approximately 4½ to 6 parts of water.

40% free resin,
60% combined resin requires approximately 4 to 5½ parts of water.

45% free resin,
55% combined resin requires approximately 3 to 3½ parts of water.

It is to be understood that the general proportions, as set forth above, will vary somewhat with different grades of resin, and that they will also vary slightly with different samples of "F grade resin" obtained on the market.

My method, based on the foregoing, consists in heating the size with an exactly sufficient quantity of water to form a clear emulsion of size-in-water at a given temperature, and in diluting this emulsion by pouring it into a larger volume of water. The preferred temperature for the preparation of the first concentrated emulsion is the boiling point of the solution. Cold water may be used for the subsequent dilution.

In preparing dilute resin emulsion containing 30% free resin, one part of F grade resin is treated with one part of water containing a sufficient quantity of sodium hydroxide in order to convert 70% of the resin into resin soap. This mixture is heated until a clear homogeneous solution is obtained. Four to five parts of hot water are then added and the mixture heated practically to the boiling temperature until a clear homogeneous solution is again obtained. The actual quantity of water to be added is dependent to some extent upon the particular grade of resin used. This clear emulsion is then diluted by pouring it into 45 parts of water, thus producing a diluted solution containing approximately 2% of total resin.

The above procedure may be modified in various ways. In place of sodium hydroxide for the partial neutralization of the resin, sodium carbonate may be used, but when this is the case the mixture must be heated longer in order to complete the reaction, and an allowance must be made for the quantity of water lost by volatilization.

In place of the resin and alkali specified above, the ordinary "prepared" resin size may be used.

It is not essential that the resin be partially neutralized in the presence of a small quantity of water and this operation followed later by the addition of hot water. The resin may be treated directly with approximately six parts of water, either hot or cold, containing sufficient alkali to produce a size containing 35% of free resin and the mixture then heated, preferably with stirring, until the clear homogeneous resin-in-water emulsion results.

In practice, it is found, however, more convenient to neutralize the resin in the presence of a small volume of water, and to add the remaining portion of water after the reaction between the resin acids and the alkali has taken place in more concentrated solution.

The above specified resin-in-water emulsion, before final dilution, contains approximately 15% of resin (free and combined) by weight. It may be diluted by pouring it either into cold water (10 to 30 degrees C.), or into warm water (30 to 60 degrees C.). The clearest diluted emulsions are, however, obtained by pouring the size into cold water. The quantity of water used for the final dilution may be varied at will, so as to produce diluted emulsions containing anywhere from one to five per cent total resin, according to mill specifications. During the final dilution agitation of the water is desirable.

A clear, hot, resin-in-water emulsion becomes milky on cooling or upon the addition of more water. However, when diluted by pouring the emulsion into a larger volume of water a clear emulsion is obtained. It should here be noted that in one case the total quantity of hot solution is being gradually diluted, whereas in the other case a given quantity of the hot solution is being suddenly cooled and simultaneously diluted.

I am aware that methods for the emulsification of resin soap in water have been used in which heated resin has been mixed with hot water and steam, and such mixture forcibly injected into a large volume of water, or in which the mixing of the size with the hot water has been accomplished under steam pressure within an injector, or wherein hot water under pressure is employed; also in which heated resin size is sprayed into hot water, and the resulting emulsion diluted. In such cases, however, the operating conditions, including the proportioning of the water to the size, have not been such as to yield an initial, practically clear, indefinitely dilutable size-in-water emulsion. In the practice of the present invention no special atomization device is required for the emulsification of resin size which contains a large percentage of free resin, and the use of steam, pressure, or a special injector-emulsifier is entirely superfluous.

What I do claim as my invention, and desire to secure by Letters Patent, is—

1. Method of preparing resin size-in-water emulsions from resin size containing free resin, characterized thereby, that the size is incorporated with water in the proportion required to yield at the operating temperature a practically clear size-in-water emulsion, said emulsion stable at approximately the boiling point, and capable of being indefinitely diluted by introduction in a heated state into additional water.

2. Method according to claim 1, wherein the initial size-in-water emulsion contains approximately 3–9 parts of water per part of size, the amount of water proportioned according to the free resin content of the size to yield therewith a practically clear emulsion.

3. As a new composition of matter, a practically clear resin size-in-water emulsion, the resin size containing about 30–45% of free resin, and the water constituting approximately 3–9 parts per part of size and proportioned according to the free resin content of the size to yield therewith a practically clear size-in-water emulsion stable at approximately the boiling point, and capable of being indefinitely diluted by introduction in a heated state into additional water.

OLIVER KAMM.

Witnesses:
 HERMANN R. HARRIGAN,
 FRANK H. TENDICK.